United States Patent
Storino et al.

(10) Patent No.: US 6,681,345 B1
(45) Date of Patent: Jan. 20, 2004

(54) FIELD PROTECTION AGAINST THREAD LOSS IN A MULTITHREADED COMPUTER PROCESSOR

(75) Inventors: Salvatore N. Storino, Rochester, MN (US); Gregory J. Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 09/639,190

(22) Filed: Aug. 15, 2000

(51) Int. Cl.[7] .............................................. G06F 11/00
(52) U.S. Cl. ........................... 714/42; 714/38; 717/127
(58) Field of Search ..................... 714/42, 38; 717/127

(56) References Cited

U.S. PATENT DOCUMENTS

| | | | |
|---|---|---|---|
| 5,778,230 A | * | 7/1998 | Wimble et al. .............. 717/131 |
| 5,778,243 A | * | 7/1998 | Aipperspach et al. ......... 712/11 |
| 5,953,530 A | * | 9/1999 | Rishi et al. .................. 717/127 |
| 6,009,269 A | * | 12/1999 | Burrows et al. ............. 717/130 |
| 6,018,759 A | * | 1/2000 | Doing et al. ................ 709/108 |
| 6,035,426 A | * | 3/2000 | Applegate .................... 714/54 |
| 6,119,145 A | * | 9/2000 | Ikeda et al. ................. 709/203 |
| 6,192,486 B1 | * | 2/2001 | Correale et al. ............... 714/8 |
| 6,256,775 B1 | * | 7/2001 | Flynn .......................... 717/127 |
| 6,418,542 B1 | * | 7/2002 | Yeager ......................... 714/38 |
| 6,434,714 B1 | * | 8/2002 | Lewis et al. .................. 714/38 |
| 6,457,142 B1 | * | 9/2002 | Klemm et al. ................ 714/38 |
| 6,567,839 B1 | * | 5/2003 | Borkenhagen et al. ....... 709/103 |
| 2002/0059503 A1 | * | 5/2002 | Dennie ........................ 711/153 |

FOREIGN PATENT DOCUMENTS

JP 2002108630 A * 4/2002 ............. G06F/9/46

* cited by examiner

Primary Examiner—Robert Beausoliel
Assistant Examiner—Yolanda L Wilson
(74) Attorney, Agent, or Firm—Karuna Ojanen (57) ABSTRACT

A method, apparatus, and a program product to protect against thread loss in a multithreaded computer processor. The processor may experience the failure of one or more threads; in accordance with the invention, a functional test can be run to determine which thread is experiencing the failure. If the thread failure results the failure of a register/array that is uniquely associated with the thread, then the invention will disable access to those register/arrays. Each thread may have its own set of register/arrays or it may be uniquely assigned to one of a plurality of storage elements in a multithreaded register/array. Using this invention, a processor may continue processing other threads and the instructions and data associated with the disabled or defective thread can be rerouted.

10 Claims, 6 Drawing Sheets

FIELD PROTECTION AGAINST THREAD LOSS IN A MULTITHREADED COMPUTER PROCESSOR

TECHNICAL FIELD

This invention relates generally to the field of computer memory circuits and more particularly relates to a method to protect against the loss of computer operations after manufacture and sale of the computer resulting from failure of a register/arrays associated with only one thread of operation.

BACKGROUND OF THE INVENTION

As consumers of computer processing services, businesses dread the occurrence of down time resulting from a computer failure, yet these events actually happen in any number of ways. A hard drive with data that hasn't been backed-up may crash and the data may be lost. A larger fear, perhaps, is when the processor core of a computer fails to perform properly. New or additional memory will not render the computer functional: the computer itself is broke! Such loss of processing power can be disastrous to many businesses; recall a particular airline's dilemma when its routing and scheduling was unavailable for many hours. Millions and even up to billions of dollars can be lost resulting from downtime of computers.

To avoid the failure of a computer after its components have been fabricated and assembled and the computer has been sold, many manufacturers test their processors and memory components before the computers are sold to customers and eliminate the computer components having errors. In spite of the best efforts to detect and eliminate defective computer processors, computer hardware may still fail during normal stressed processing operations at a customer's location. One type of failure of a processor may be attributed, inter alia, to AC defects of the general and special purpose registers within the processor core and of the computer's main random access memory caused by stressing the components under normal usage.

Some tests are performed at the customer's location, e.g., static random access memory (SRAM) arrays are typically tested at boot-up. If a processor fails its test, it is marked as a "failure" and the system is typically disabled until customer service appears. In the case of multiple processors, a particular processor may be disabled leaving the other processors to take on extra processing so that computer performance is compromised until customer services arrives.

SRAMs, however, do not have multithreaded memory cells. Currently, if a failure occurs in a multithreaded memory array or register, the multithreaded computer system displays an error code indicating a failure as data collision from multiple threads and either the entire system is disabled or, if the system is made up of multiple processors, it operates without the failing processor. In any event, the processor having the failed thread is disabled and processing is compromised.

There is a need in the industry of multithreaded computers to detect defects in registers and/or memory arrays having multithreaded storage cells during normal processing operations. If only those storage elements in a multithreaded memory or register associated with a failed thread becomes unavailable to the processor, the processor itself would not have to be disabled; rather the processor could continue normal processing of the other thread(s) which don't have defective storage elements and could reroute the thread associated with the defective storage elements to intact storage elements. This method would still keep the processor in service rather than disabling the entire processor.

SUMMARY OF THE INVENTION

These needs and others that will become apparent to one skilled in the art are satisfied by a method to continue normal computer processing in a hardware multithreaded computer processing system executing a plurality of threads despite the failure of one of the threads, the method comprising the steps of: executing instructions of at least one of the threads in a hardware multithreaded processor having a plurality of hardware register/arrays, each one of the register/arrays associated with each one of the threads; performing a test on a particular thread and the at least one register/array associated with the particular thread; detecting the failure of the at least one register/array associated with the particular thread; disabling the failed register/array associated with the particular thread; and rerouting data of the particular thread to other individual register/arrays that are not defective.

The register/array may be a multithreaded register/array having multithreaded storage cells each comprising a number of storage elements each associated with one thread. In this case, the method of the invention to continue normal computer processing in a hardware multithreaded computer processing system executing a plurality of threads despite the failure of one of the threads comprises the steps of: executing instructions of at least one of the plurality of threads in a hardware multithreaded processor having at least one multithreaded register/array with individual storage elements associated with each of the plurality of threads; performing a test on a particular thread and the at least one multithreaded register/array having individual storage elements associated with the particular thread; detecting the failure of at least one individual storage element associated with the particular thread; disabling all storage elements associated with the particular thread; and rerouting data of the particular thread to other individual storage elements associated with other of the plurality of threads not having defective storage elements.

The method may further comprise generating an error signal indicating failure of the at least one individual storage element associated with the particular thread. Normal processing of the other threads not having defective storage elements may continue.

The step of performing a test on a particular thread and the at least one multithreaded register/array having individual storage elements associated with the particular thread may further comprise running a functional test to execute instructions under stressed processing conditions. Alternatively, the test may be a n ABIST and/or LBIST test.

The step of disabling all storage elements associated with the particular thread may comprise generating a thread select signal to select others of individual storage elements associated with other threads. In another embodiment, the step of disabling all storage elements associated with the particular thread further may comprise disabling all or some of a plurality of thread switch control events pertaining to the particular thread in a thread switch control register.

The invention may further be considered a multithreaded computer system capable of disabling one thread in the field comprising: at least one multithreaded computer processor; at least one thread switch control register for each of a plurality of threads of operation in the multithreaded computer processor; at least one hardware multithreaded memory/register array having multithreaded storage cells in which each of the storage cells has a storage element uniquely associated with one thread; a main memory connected to the at least one multithreaded computer processor; a bus interface connecting the multithreaded computer processor and the main memory to at least one of the group consisting of: a plurality of data storage devices, one or more external communication networks, one or more input/output devices for providing user input to/from the computer processor; a functional test generator to perform a functional test of at least one thread in the multithreaded computer processor in the field during normal processing; a storage element failure detector which detects the failure of a storage element uniquely associated with the thread undergoing the functional test; a storage element disabler to disable all the storage elements associated with the thread experiencing the failure in the functional test; a data rerouter to redirect data from the thread to storage elements associated with other threads to continue processing; and an error signal generator to propagate a message indicating that the one thread has failed.

The invention is also a program product for use with a hardware multithreaded computer processor for detecting the failure of one of a plurality of threads of operation, the program product comprising a signal-bearing medium carrying thereon: a functional test having a series of instructions of at least one of the plurality of threads; a thread disabler to disable individual storage elements in multithreaded storage cells in hardware registers/memory arrays; the disabled individual storage elements each associated with the at least one thread failing the functional test; a data rerouter to reconfigure any programmable registers to reroute data of the at least one thread failing the functional test to other storage elements in multithreaded storage cells associated with other threads not failing the functional test; and an error message generator to indicate that the at least one thread failed the functional test.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
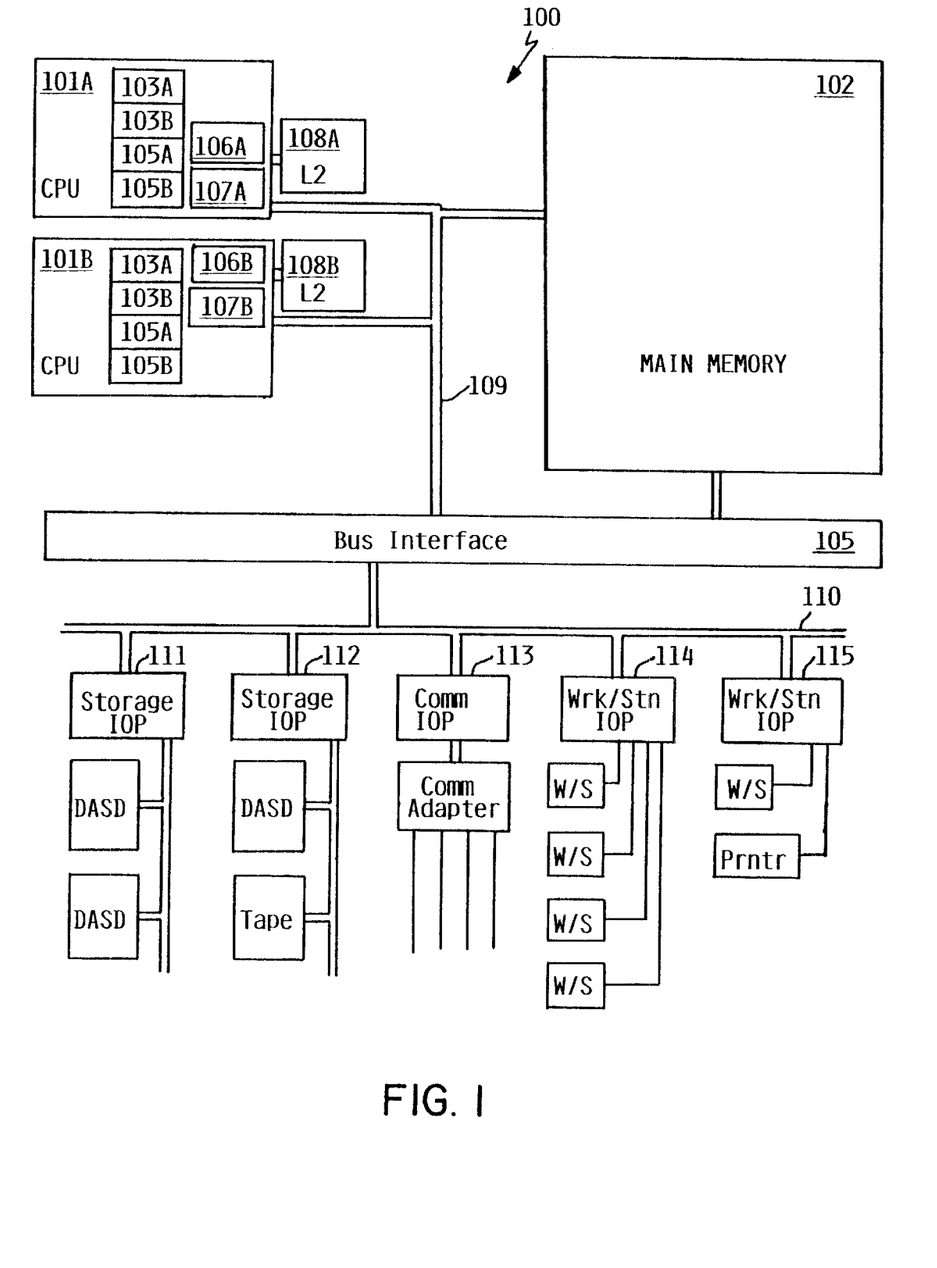
FIG. 1 illustrates the major hardware components of a computer system for utilizing multithreaded registers/memory arrays with storage cells for individual threads according to the preferred embodiment of the present invention.

The major hardware components of a computer system 100 having a register with multithreaded storage cells which can be selectively disabled according to the preferred embodiment of the present invention are shown in FIG. 1. Central processing units (CPUs) 101A and 101B support hardware multithreaded operations in performing basic machine processing on instructions and data from main memory 102. Each CPU 101A and 101B contains respective internal level one instruction caches 106A, 106B (L1 I-cache), and level one data caches 107A, 107B (L1 D-cache). Each L1 I-cache 106A, 106B stores instructions for execution by its CPU. Each L1 D-cache stores data other than instructions to be processed by its CPU. Each CPU 101A, 101B is coupled to a respective level two cache (L2-cache) 108A, 108B which can be used to hold both instructions and data. Memory bus 109 transfers data among CPUs and memory. CPUs 101A, 101B and memory 102 also communicate via memory bus 109 and bus interface 105 with system I/O bus 110. Various I/O processing units (IOPs) 111–115 attach to system I/O bus 110 and support communication with a variety of storage and I/O devices, such as direct access storage devices (DASD), tape drives, workstations, printers, and remote communication lines for communicating with remote devices or other computer systems. For simplicity, CPU, L1 I-cache, L1 D-cache, and L2 cache are herein designated generically by reference numbers 101, 106, 107 and 108, respectively. While various buses are shown in FIG. 1, it should be understood that these are intended to represent various communications paths at a conceptual level, and that the actual physical configuration of buses may vary, and in fact may be considerably more complex. It should further be understood that FIG. 1 is intended as but one example of a system configuration, and that the actual number, type and configuration of components in a computer system may vary. In particular, the present invention could be employed in systems having a single multithreaded CPU, or in systems have multiple multithreaded CPUs.

Each CPU 101 is capable of maintaining the state of multiple threads. CPU 101 will typically include a plurality of general purpose registers for storing data, and various special-purpose registers for storing conditions, intermediate results, instructions, and other information which collectively determine the state of the processor. This information is replicated for each thread supported by CPU 101. Within the CPU 101, there are hardware thread state registers 103A and 103B for each thread which contains information regarding the thread's priority, its active or inactive status, etc. Shown in FIG. 1 are two thread state registers assuming a two-threaded system; however, the processor may be capable of maintaining the state of and processing more than two threads. The thread state register generates an active thread signal. Hardware thread switch control registers 105A and 105B that can be programmed to select the events which generate thread switching. Each thread switch control event has a separate enable bit in the thread switch control register 105. There may be a separate thread switch control register for each thread but more frequently the individual bit circuits of the register corresponding to an individual thread would typically be physically interleaved on a chip, i.e., bit 0 of the register portion for thread 0 would be physically adjacent bit 0 of register portions for each of the other threads; the respective bit 1 circuits would all be physically adjacent each other, etc. The thread switch control events for one thread in one thread switch control register need not be identical to the thread switch control events associated with another thread or to the events in any other thread switch control register. The thread switch control register can be written by a service processor as is known in the art. The contents of the thread switch control register is used by a hardware thread switch controller to enable or disable the generation of a thread switch in the multithreaded processor. A value of one in the register enables the thread switch control event associated with that bit to generate a thread switch. A value of zero in the thread switch control register disables the thread switch control event associated with that bit from generating a thread switch. A value of zero in each of bits 22:29 will disable the thread associated with that bit. Of course, an instruction in the executing thread could disable any or all of the thread switch conditions for that particular thread or for other threads. The following table provides an example of the association between thread switch events and their enable bits in the thread switch control register.

| Thread Switch Control Register Bit Assignment | |
|---|---|
| (0) | Switch on L1 data cache fetch miss |
| (1) | Switch on L1 data cache store miss |
| (2) | Switch on L1 instruction cache miss |
| (3) | Switch on instruction TLB miss |
| (4) | Switch on L2 cache fetch miss |
| (5) | Switch on L2 cache store miss |
| (6) | Switch on L2 instruction cache miss |
| (7) | Switch on data TLB/segment lookaside buffer miss |
| (8) | Switch on L2 cache miss and dormant thread not L2 cache miss |
| (9) | Switch when thread switch time-out value reached |
| (10) | Switch when L2 cache data returned |
| (11) | Switch on IO external accesses |
| (12) | Switch on double-X store: miss on first of two* |
| (13) | Switch on double-X store: miss on second of two* |
| (14) | Switch on store multiple/string: miss on any access |
| (15) | Switch on load multiple/string: miss on any access |
| (16) | Reserved |
| (17) | Switch on double-X load: miss on first of two* |
| (18) | Switch on double-X load: miss on second of two* |
| (19) | Switch on or 1, 1, 1 instruction if machine state register (problem state) bit, msr(pr) = 1. Allows software priority change independent of msr(pr). If bit 19 is one, or 1, 1, 1 instruction sets low priority. If bit 19 is zero, priority is set to low only if msr(pr)= 0 when the or 1, 1, 1 instruction is executed. See changing priority with software, to be discussed later. |
| (20) | Reserved |
| (21) | Thread switch priority enable |
| (22:29) | Thread enablement - one per thread |
| (30:31) | Forward progress count |
| (32:63) | Reserved in 64 bit register implementation |

*A double-X load/store refers to loading or storing an elementary halfword, a word, or a double word, that crosses a doubleword boundary. A double-X load/store in this context is not a load or store of multiple words or a string of words.

Additional background information concerning multithreaded processor design is contained in the following commonly assigned copending U.S. patent applications, herein incorporated by reference in their entireties: Serial No. unknown, filed concurrently herewith entitled Changing the Thread Capacity of a Multithreaded Computer Processor; Ser. No. 09/439,581 filed Nov. 12, 1999 entitled Master-Slave Latch Circuit for Multithreaded Processing; Ser. No. 09/266,133 filed Mar. 10, 1999 entitled Instruction Cache for Multithreaded Processor; Ser. No. 08/976,533 filed Nov. 21, 1997 entitled Accessing Data from a Multiple Entry Fully Associative Cache Buffer in a Multithread Data Processing System; Ser. No. 08/966,706 filed Nov. 10, 1997 entitled Effective-To-Real Address Cache Managing Apparatus and Method; Ser. No. 08/958,718 filed Oct. 23, 1997, entitled Altering Thread Priorities in a Multithreaded Processor; Ser. No. 08/958,716 filed Oct. 23, 1997, entitled Method and Apparatus for Selecting Thread Switch Events in a Multithreaded Processor; Ser. No. 08/957,002 filed Oct. 23, 1997 entitled Thread Switch Control in a Multithreaded Processor System; Ser. No. 08/956,875 filed Oct. 23, 1997 entitled An Apparatus and Method to Guarantee Forward Progress in a Multithreaded Processor; Ser. No. 08/956,577 filed Oct. 23, 1997 entitled Method and Apparatus To Force a Thread Switch in a Multithreaded Processor; Ser. No. 08/773,572 filed Dec. 27, 1996 entitled Background Completion of Instruction and Associated Fetch Request in a Multithread Processor. While the multithreaded processor design described in the above applications is a coarse-grained multithreading implementation, it should be understood that the present invention is applicable to either coarse-grained or fine-grained multithreading.

A multithreaded memory array contrasts with a conventional two-threaded memory array having a common read data bus. The paradigm of computer architecture having the common read bus assumed that read independence is necessary and requires a separate read decoder for data of each thread to be read simultaneously. It was discovered, however, that a multithreaded memory having an optimized wireability and associated optimally minimized transistor count can be achieved by eliminating read independence without suffering significant negative consequences because the number of instances in which data for two or more threads are simultaneously required is negligible. The multithreaded storage cell of FIG. 2 reflects the discovery that consumption in chip-surface area can be reduced significantly by elimination of read independence without suffering substantial negative consequences because read independence is a negligible functional attribute for a processor that can only access one thread at a time. Fewer transistors are required for the thread selector and the read ports than what would have been necessary to form separate read ports for each of the threads.

Figure 2:
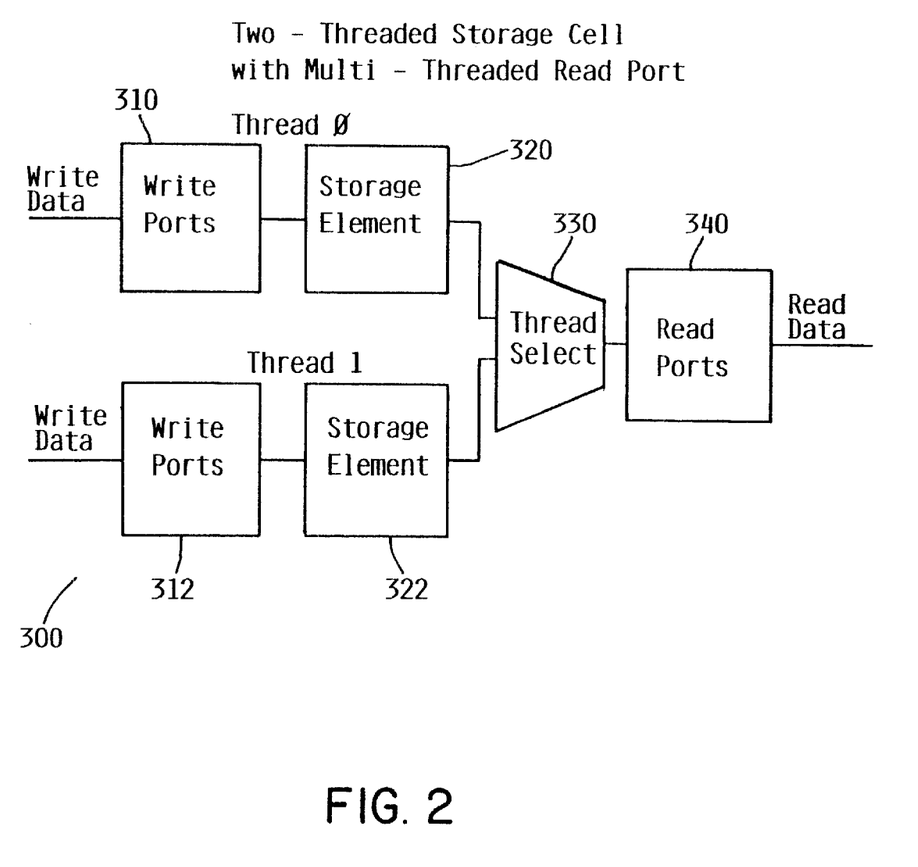
FIG. 2 is a simplified block diagram of a multithreaded storage cell.

FIG. 2 depicts a block diagram of a multithreaded storage cell as in U.S. Pat. No. 5,778,243, commonly owned by the assignee herein and incorporated by reference in its entirely. The multithreaded storage cell 300 has a multithreaded read interface including a thread selector 330 for selectively connecting threads 0 and 1 to the read ports 340. The number of read ports 340 corresponds to the number of functional units, usually more than one, e.g., six to eight functional units, that can be read from storage elements 320 and 322. An example of a functional unit is a arithmetic logic unit that can perform integer, logical shifting, field extraction and/or floating point operations and/or conversions between integer and floating point number representations. For a read operation, each storage element 320, 322 is connected to a functional unit as follows: the storage element 320, 322 is connected to the thread selector 330; the thread selector 330 is connected to one of the read ports 340; this one port is connected to a decoder (not shown in FIG. 2); and the decoder is connected to the functional unit, also not shown in FIG. 2.

FIG. 2 also includes write ports 310 for thread 0 and write ports 312 for thread 1, the number of write ports corresponding in number to the number of functional units, usually more than one, e.g., three or twelve functional units, that can write to the storage element; storage element 320 for thread 0 connected to the write ports 310 and the thread selector 330 and storage element 322 for thread 1 connected to the write ports 312 and thread selector 110.

A processor (not shown) can read the data in the storage element 320 by controlling the thread selector 330 to select thread 0, thereby making the data of storage element 320 available on the read ports 340. Similarly, to read the data in the storage element 322, it is necessary for the processor to control the thread select 330 to select the line from the storage element 322.

Figure 3:
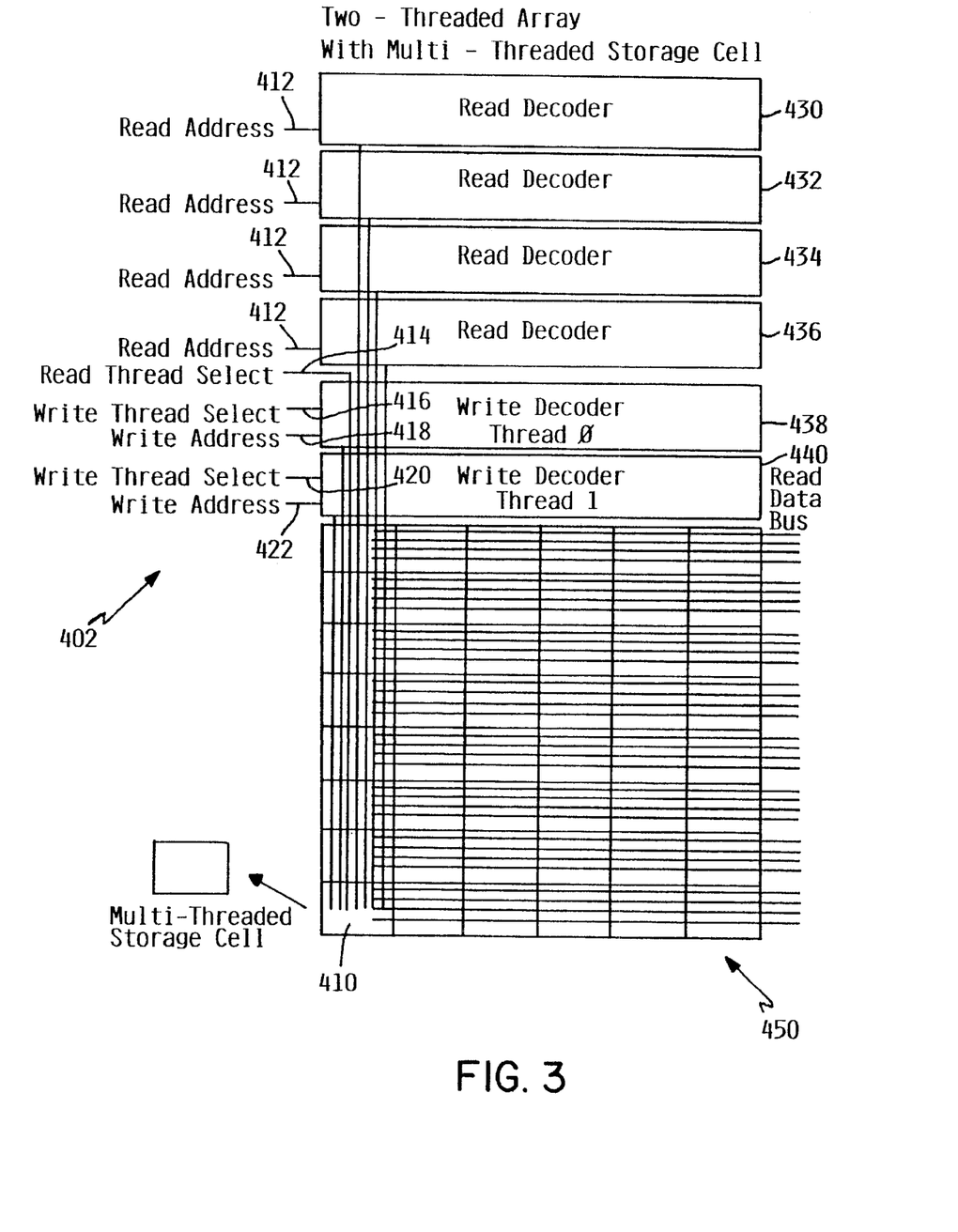
FIG. 3 is a more detailed block diagram of the multithreaded storage cell of FIG. 2.

FIG. 3 depicts a more detailed block diagram of the embodiment of FIG. 2. FIG. 3 shows a two-threaded array 402 formed from multithreaded storage cells 410. The two-threaded array of FIG. 3 includes read decoders 430, 432, 434, 436, a write decoder 438 for thread 0, a write decoder 440 for thread 1, and an array 450 of the multithreaded storage cells 410. Only the wire interconnections for one storage cell 410 are shown because the interconnections for the other cells in the array are the same.

Each of the write decoders 438, 440 is connected to a write address bus 418, 422 and is connected to its own write thread select line 416, 420, respectively. In this fashion, thread selection is made externally to the two-threaded register 402. In contrast, the read decoder, e.g., 430, 432, 434,436 is connected to the read address bus 412 but not connected to the read thread select line 414. Rather, each of the memory cells 410 is connected to the read thread select line 414 so that the selection of which thread to read takes place within, rather then externally to, the multithreaded storage cell 410.

Figure 4:
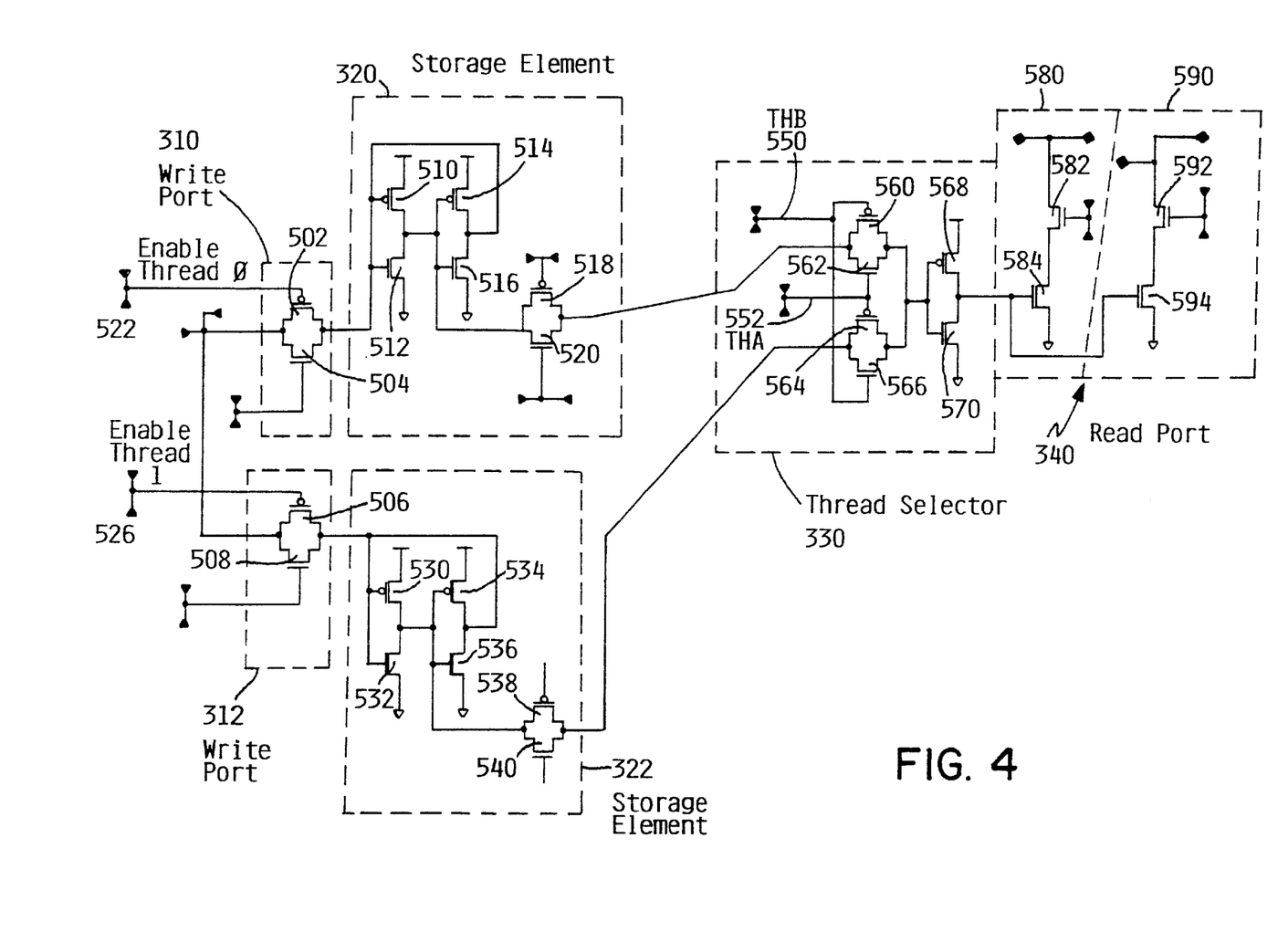
FIG. 4 is a schematic depiction of the multithreaded storage cell of FIG. 3.

FIG. 4 depicts a schematic diagram of the embodiment of FIG. 2. In particular the blocks are shown as having been formed from CMOS transistors, although the invention is application to NMOS, BICMOS, BINMOS, bipolar, SOI, and GaAS, among other technologies. A storage element 320 is formed from transistors 510, 512, 514, 516, 518, 520 and holds a single bit. The write port 310 is shown as only having a single port because of a simplifying assumption of only one functional unit writing to the storage element though as stated above there could be more than one such functional unit formed from transistors. Similarly the write port is formed from transistors 502, 504. The storage element 322 is formed from transistors 530, 532, 534, 536, 538, 540. The thread selector 330 is formed from the transistors 560, 562, 564, 566, 568, 570. Based upon the state of the signal THB on line 550 connected to the gate of transistor 560 and the gate of transistor 566 and the signal THA on line 552 connected to the gate of transistor 562 and the gate of transistor 564, the thread selector 330 selects either the first or second thread. The read port(s) 340 includes two ports 580 and 590, the first port 580 being formed from the transistors 582 and 584 and the second port 590 being formed from the transistors 592 and 594. Again, the number of ports at each interface is exemplary and in practice will vary according to the number of functional units that can write/read to/from a storage element.

After manufacture, the registers and memory arrays having the multithreaded storage cells are tested. There are several test procedures of LBIST and ABIST are only two. Simply stated, a known bit sequence is input into the array and compared with the output of the array. In a properly functional memory array, the input matches the output. These sequences can be performed at high speeds and can involve many memory cells simultaneously to "stress" the processor to determine its failure parameters, if any. Another kind of test is a functional test in which actual coded instructions typical of customer performance requirements are executed under stress to exercise critical sections of the memory arrays. Again, these tests can be performed at different processor speeds to determine if and when the processor may fail. Such failures are most commonly the result of memory arrays and general and specialized registers unable to capture and hold a bit value in the multithreaded storage cell. An important feature of the invention is the ability to test the values stored in individual storage cells associated with separate threads. In other words, in the context of the invention, each thread can now be tested separately.

As will be described in detail below, aspects of the preferred embodiment pertain to specific method steps implementable in a multithreaded computer system 100. In an alternative embodiment, the invention may be implemented as a computer program-product for use with a computer system 100. The programs defining the functions of the preferred embodiment can be delivered to the computer 100 via a variety of signal-bearing media, which include, but are not limited to: (a) information permanently stored on non-writable storage media, e.g., read only memory devices connected to bus 110 such as CD-ROM disks; (b) alterable information stored on writeable magnetic or optical storage media, e.g., floppy disks within diskette drive or hard-disk drive or other data storage devices; or (c) information conveyed to a computer by a telephone or a cable media network, including wireless communications. Such signal-bearing media, when carrying computer-readable instructions that direct the functions of the present invention, represent alternative embodiments of the present invention.

Figure 5:
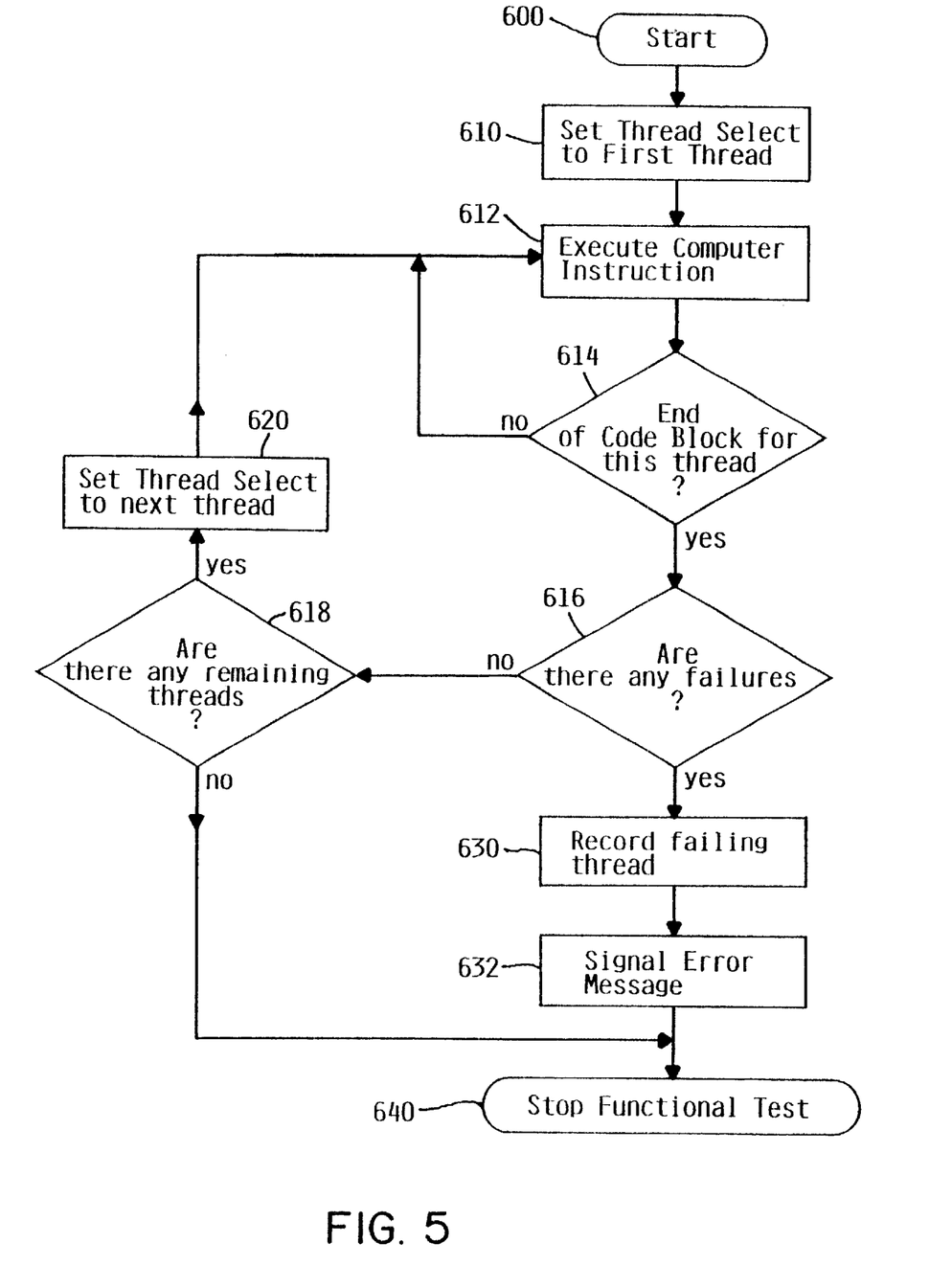
FIG. 5 is a simplified flow chart of the process by which to detect that a storage element of a multithreaded cell is defective.

FIG. 5 is a simplified flow chart of a method by which to detect failures of a multithreaded processor. Although FIG. 5 illustrates a functional test which executes actual coded instructions until a failure occurs, if at all, other tests, e.g., ABIST, LBIST, etc., intended to test memory arrays can also be used in the context of the invention. Typically these tests are performed after manufacturing and/or periodically during the normal operation of the processor system in the field, i.e., at the customer's location during normal processor performance. From start at step 600, the process proceeds to step 610 where a first thread becomes the active or selected thread. Next in step 612, an instruction of the selected thread is executed in the processor. At step 614, the test procedure checks to see if there are further instructions of the selected thread to be executed. If there are further instructions, then the process loops back to step 612 to execute the next instruction for that thread. If, however, at step 614, there are no further instructions for the selected thread, then at step 616, the process inquires if there are any failures during the execution of the instructions for the selected thread.

If there are no register or memory array failures in step 616, the process checks to see if there are additional threads to test, as in step 618. If so, as in step 620, the thread select is programmed to select another thread for testing the execution of its instructions, as in step 612 again. If, however, the first thread experienced a failure, the failure is recorded in step 630 and a signal error message is generated at step 632. At this time, the test may be terminated at step 640 because the processor has experienced a functional failure in a multithreaded register or memory array. Prior to the inventive features disclosed herein, the processor chip experiencing the failure would be disabled and the customer's computer operations may be paralyzed or severely handicapped even though other threads within the processor could execute properly and the storage cells for other threads may be fully functional because not all the threads were tested.

Figure 6:
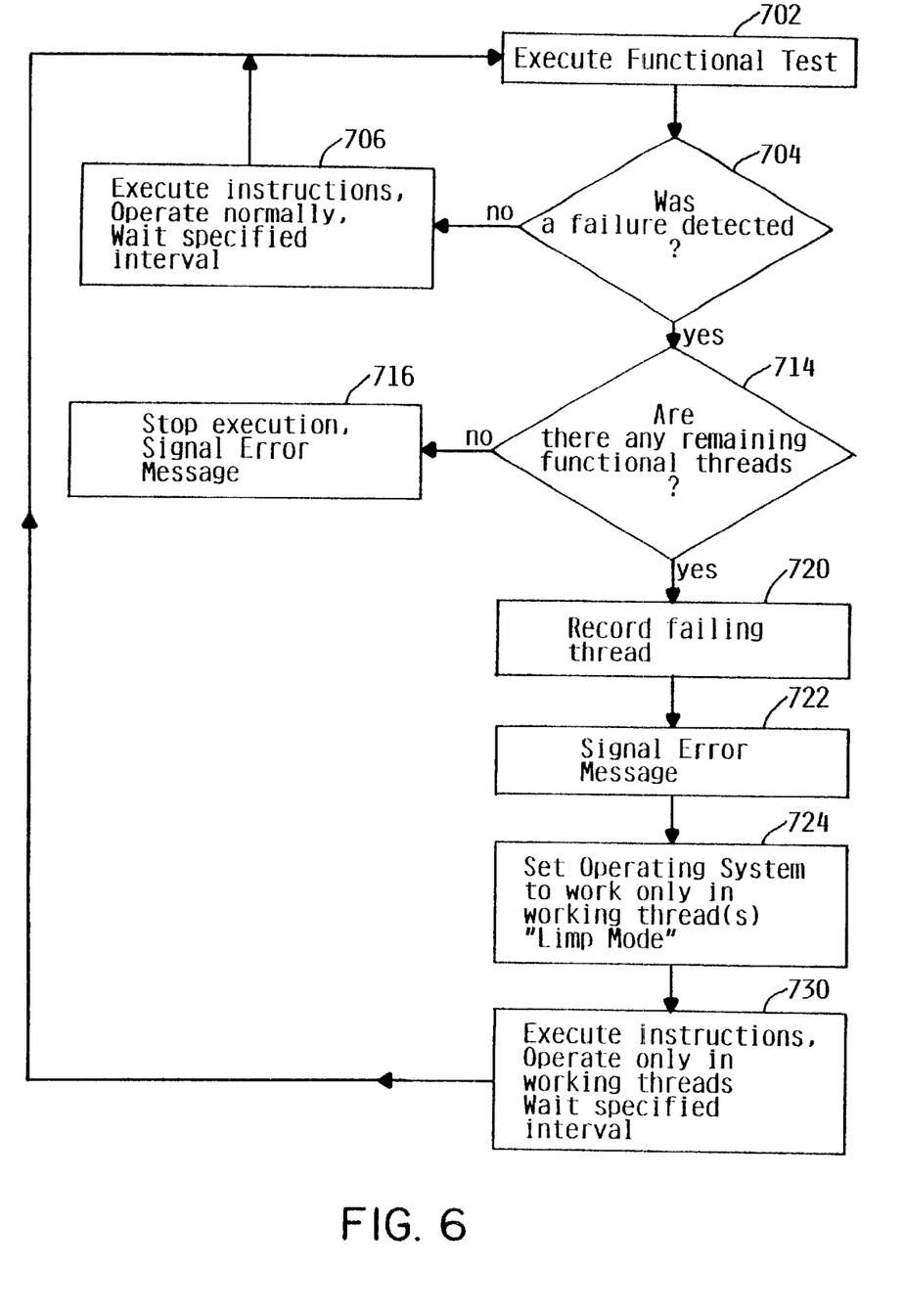
FIG. 6 is a simplified flow chart of the process by which to disable the storage elements of a storage register and reroute the data intended for that thread according to the preferred embodiment of the invention. It is suggested that FIG. 6 be printed on the face of the patent.

In this fashion, the flow chart of FIG. 6 represents several inventive features resulting in the advantage of salvaging the customer's processing operations by ascertaining which particular thread is dysfunctional. In this fashion, the processor having the multithreaded registers need not be disabled but the instructions and data for the thread experiencing failures in the multithreaded memory array may be rerouted to storage cells of the other threads in the same or different array or register. In step 702, the functional test, as in FIG. 5, is performed. If no failure was detected during performance of the functional test in step 704, normal processing ensues in step 706. If, however, a failure was detected in step 704, the process interrogates the system to determine if there are any remaining functional threads in step 714. Of course, if there are no remaining functional threads, then at step 716, the processor stops execution and generates an error message. If, however, there are other threads that have satisfactorily completed and passed the functional tests from the inquiry of step 714, then at step 720, the thread(s) that failed are recorded and an error message is generated to that effect in step 722. In step 724, the operating system is notified of the failing threads and it responds appropriately to process only the functional threads. This can be done by providing appropriate signal input into the thread select 330 or by disabling bits in the thread switch control register for the particular thread and then rerouting the instructions to another thread switch control register. In any event, at step 730 instructions may be executed so long as they operate only in the functional threads.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to continue normal computer processing in a hardware multithreaded computer processing system executing a plurality of threads despite the failure of one of the threads, said method comprising the steps of:

(a) executing instructions of at least one of said plurality of threads in a hardware multithreaded processor having a hardware thread state register and a hardware thread switch control register, and further having at least one multithreaded register/array, the multithreaded hardware register/array having a plurality of multithreaded storage cells, each one of said plurality of storage cell having a number of storage elements, the number of storage elements in a storage cell corresponding to the number of said plurality of threads capable of being processed said hardware multithreaded and each storage cell uniquely associated with a respective one of said plurality of threads;

(b) performing a test on a particular thread and the at least one multithreaded register/array having individual storage elements associated with the particular thread;

(c) detecting the failure of at least one individual storage element associated with the particular thread;

(d) disabling all storage elements in the at least one multithreaded register/array associated with the particular thread; and (e) rerouting data of the particular thread to other individual storage elements associated with other of the plurality of threads not having defective storage elements.

2. The method of claim 1, further comprising:

(a) generating an error signal indicating failure of the at least one individual storage element associated with the particular thread.

3. The method of claim 2, further comprising:

(a) continue normal processing of said other of the plurality of threads not having defective storage elements.

4. The method of claim 1, wherein said step of performing said test on a particular thread and the at least one multithreaded register/array having individual storage elements associated with said particular thread further comprises running a functional test to execute instructions under stressed processing conditions.

5. The method of claim 1, wherein said step of performing said test on a particular thread and the at least one multithreaded register/array having individual storage elements associated with said particular thread further comprises running an ABIST and/or LBIST test on said at least one multithreaded register/array.

6. The method of claim 1, wherein said step of disabling all storage elements associated with said particular thread further comprises generating a thread select signal to select others of individual storage elements associated with other of said plurality of threads.

7. A method to continue normal computer processing in a hardware multithreaded computer processing system executing a plurality of threads despite the failure of one of the threads, said method comprising the steps of:

(a) executing instructions of at least one of said plurality of threads in a hardware multithreaded processor having at least one multithreaded register/array with individual storage elements associated with each of said plurality of threads;

(b performing a test on a particular thread and the at least one multithreaded register/array having individual storage elements associated with the particular thread;

(c) detecting the failure of at least one individual storage element associated with the particular thread;

(d) disabling all storage elements associated with the particular thread by disabling all or some of a plurality of thread switch control events pertaining to said particular thread in a thread switch control register; and (e) rerouting data of the particular thread to other individual storage elements associated with other of the plurality of threads not having defective storage elements.

8. A multithreaded computer system capable of disabling one thread in the field comprising:

(a) at least one multithreaded computer processor;

(b) at least one hardware thread switch control register for each of a plurality of threads of operation in said multithreaded computer processor;

(c) at least one hardware multithreaded memory/register array having multithreaded storage cells in which each of said storage cells has a storage element uniquely associated with one thread;

(d) a main memory connected to the at least one multithreaded computer processor;

(e) a bus interface connecting the multithreaded computer processor and the main memory to at least one of the group consisting of: a plurality of data storage devices, one or more external communication networks, one or more input/output devices for providing user input to/from the computer processor;

(f) a functional test generator to perform a functional test of at least one thread in the at least one multithreaded computer processor in the field during normal processing;

(g) a storage element failure detector which detects the failure of a storage element uniquely associated with the at least one thread undergoing the functional test;

(h) a storage element disabler to disable all the storage elements associated with the at least one thread undergoing the functional test;

(i) a data rerouter to redirect data from the at least one thread to storage elements associated with other threads of operation to continue processing; and (j) an error signal generator to propagate a message indicating that a failure of the at least one thread has occurred.

9. A computer program product having a computer readable medium with computer readable program code stored thereon for use with a hardware multithreaded computer processor to detect the failure of one of a plurality of threads, said program product comprising a signal-bearing medium carrying thereon:

(a) a functional test having a series of instructions for at least one of the plurality of threads;

(b) a thread disabler to disable individual storage elements in multithreaded storage cells in hardware registers/memory arrays; the disabled individual storage elements each associated with the at least one thread failing the functional test;

(c) a data rerouter to reconfigure any programmable registers to reroute data of the at least one thread failing the functional test to other storage elements in multithreaded storage cells associated with other threads not failing the functional test; and (d) an error message generator to indicate that the at least one thread failed the functional test.

10. A method to continue normal computer processing in a hardware multithreaded computer processing system executing a plurality of threads despite the failure of one of the threads, said method comprising the steps of:

(a) executing instructions of at least one of said plurality of threads in a hardware multithreaded processor having a plurality of hardware register/arrays, each associated with each of said plurality of threads;

(b) performing a test on a particular thread and the at least one register/array associated with the particular thread;

(c) detecting the failure of the at least one register/array associated with the particular thread;

(d) disabling the failed register/array associated with the particular thread; and (e) rerouting data of the particular thread to other individual register/arrays that are not defective.

* * * * *